United States Patent
Asplund et al.

(10) Patent No.: US 9,559,763 B2
(45) Date of Patent: *Jan. 31, 2017

(54) METHOD AND ARRANGEMENT FOR POLARIZATION CONTROL IN A COMMUNICATION SYSTEM

(71) Applicant: TELEFONAKTIEBOLAGET L M ERICSSON (PUBL), Stockholm (SE)

(72) Inventors: Henrik Asplund, Stockholm (SE); Andres Reial, Malmö (SE); Bo Hagerman, Tyresö (SE); Fredrik Ovesjö, Älvsjö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/994,956

(22) Filed: Jan. 13, 2016

(65) Prior Publication Data

US 2016/0134347 A1    May 12, 2016

Related U.S. Application Data

(63) Continuation of application No. 13/020,205, filed on Feb. 3, 2011, now Pat. No. 9,270,359.

(Continued)

(51) Int. Cl.
*H04B 7/02* (2006.01)
*H04L 1/02* (2006.01)
(Continued)

(52) U.S. Cl.
CPC .......... *H04B 7/0469* (2013.01); *H04B 7/0413* (2013.01); *H04B 7/0473* (2013.01);
(Continued)

(58) Field of Classification Search
CPC ......... H04B 1/713; H04B 7/0413; H04B 7/04; H04B 7/0473; H04B 7/0469; H04L 2025/03426; H04L 25/03343; H04L 27/2626

See application file for complete search history.

(56) References Cited

U.S. PATENT DOCUMENTS 5,400,037 A    3/1995    East
5,966,102 A   10/1999    Runyon
(Continued)

FOREIGN PATENT DOCUMENTS

CN    1282468 A    1/2001
CN    101849369 A    9/2010
(Continued)

OTHER PUBLICATIONS

3GPP TSG RAN WG1, Pre-coded MIMO DL for E-UTRA exploiting X-pol antennas, TenXc Wireless Inc, R1-051326, Seoul, South Korea, Nov. 7-11, 2005.
(Continued)

*Primary Examiner* — Hirdepal Singh
*Assistant Examiner* — Amneet Singh (57) ABSTRACT

Controlling the polarization state of signals to be transmitted from a MIMO capable radio base station node to a plurality of user equipment, which radio base station node comprises a precoder unit connecting a first and a second virtual antenna port to a respective first and second transmit antenna port, by the steps of controlling a relative phase between transmitted signals from the first and second transmit antenna port to provide a predetermined pair of orthogonal polarization states for signals transmitted on the first and second virtual antenna ports, and interchanging the polarization states of the first and second virtual antenna ports, to provide transmitted polarized signals with alternating polarization states.

14 Claims, 6 Drawing Sheets

Related U.S. Application Data (60) Provisional application No. 61/389,796, filed on Oct. 5, 2010.

(51) Int. Cl.
*H04B 7/04* (2006.01)
*H04B 7/10* (2006.01)
*H04L 1/00* (2006.01)
*H04L 1/06* (2006.01)

(52) U.S. Cl.
CPC ............... *H04B 7/10* (2013.01); *H04L 1/009* (2013.01); *H04L 1/0668* (2013.01)

(56) References Cited

U.S. PATENT DOCUMENTS

| | | | |
|---|---|---|---|
| 6,006,075 | A | 12/1999 | Smith et al. |
| 6,243,565 | B1 | 6/2001 | Smith et al. |
| 6,380,896 | B1 | 4/2002 | Berger et al. |
| 6,411,824 | B1 | 6/2002 | Eidson |
| 7,170,874 | B2 | 1/2007 | Fischer |
| 7,310,379 | B2 | 12/2007 | Sibecas et al. |
| 8,274,937 | B2 | 9/2012 | Tsai |
| 8,320,926 | B2 | 11/2012 | Hagerman et al. |
| 8,457,026 | B1 | 6/2013 | Ho et al. |
| 8,665,994 | B2 | 3/2014 | Asplund et al. |
| 8,929,953 | B2 * | 1/2015 | Asplund ........................ 455/561 |
| 9,136,932 | B2 | 9/2015 | Asplund et al. |
| 2003/0072293 | A1 | 4/2003 | Fischer |
| 2004/0264592 | A1 | 12/2004 | Sibecas et al. |
| 2006/0222101 | A1 * | 10/2006 | Cetiner ................ H01Q 21/061 375/267 |
| 2007/0041466 | A1 | 2/2007 | Chiurtu et al. |
| 2007/0099578 | A1 | 5/2007 | Adeney et al. |
| 2007/0268193 | A1 | 11/2007 | Petersson et al. |
| 2007/0279284 | A1 | 12/2007 | Karayil Thekkoott Narayanan |
| 2008/0081567 | A1 | 4/2008 | Rofougaran |
| 2008/0136721 | A1 | 6/2008 | Parsche et al. |
| 2008/0240279 | A1 | 10/2008 | Kruse |
| 2009/0005121 | A1 | 1/2009 | Wong et al. |
| 2009/0103720 | A1 | 4/2009 | Karayil Thekkoott Narayanan |
| 2009/0197544 | A1 | 8/2009 | Petersson et al. |
| 2009/0307558 | A1 | 12/2009 | Lee et al. |
| 2010/0003034 | A1 | 1/2010 | Pratt et al. |
| 2010/0039325 | A1 | 2/2010 | van Rooyen et al. |
| 2010/0054200 | A1 | 3/2010 | Tsai |
| 2010/0172430 | A1 | 7/2010 | Melzer et al. |
| 2011/0080969 | A1 * | 4/2011 | Jongren ............... H04B 7/0417 375/267 |
| 2011/0080970 | A1 | 4/2011 | De Pasquale et al. |
| 2011/0085610 | A1 | 4/2011 | Zhuang et al. |
| 2011/0216846 | A1 | 9/2011 | Lee et al. |
| 2011/0228728 | A1 | 9/2011 | Baligh et al. |
| 2011/0261894 | A1 | 10/2011 | Yu et al. |
| 2011/0263215 | A1 | 10/2011 | Asplund et al. |
| 2012/0027111 | A1 | 2/2012 | Vook et al. |
| 2012/0033630 | A1 | 2/2012 | Chung et al. |
| 2012/0108186 | A1 | 5/2012 | Göransson et al. |
| 2012/0140801 | A1 * | 6/2012 | Asplund ............... H04B 7/0417 375/219 |
| 2012/0219091 | A1 | 8/2012 | Li et al. |
| 2012/0269146 | A1 | 10/2012 | Pajukoski et al. |
| 2013/0182794 | A1 * | 7/2013 | Ringstrom ........... H04B 7/0434 375/297 |

FOREIGN PATENT DOCUMENTS

| | | |
|---|---|---|
| WO | 2008033089 A2 | 3/2008 |
| WO | 2009008805 A2 | 1/2009 |
| WO | 2010079748 A1 | 7/2010 |

OTHER PUBLICATIONS

3GPP TSG-RAN WG1 #57bis, Link Analysis of non-TxD Type 2/3 receivers in 2 transmit antenna environment, Qualcomm Europe, R1-092871, Los Angeles, CA, USA, Jun. 29-Jul. 3, 2009.

3GPP TSG-RAN WG1 Meeting #57bis, Dealing wih UTRA UEs in 2-TX antenna environment, Nokia Siemens Networks, Nokia Corporation, R1-092827, Los Angeles, CA, USA, Jun. 29-Jul. 3, 2009.

Asplund, et al., Propagation characteristics of polarized radio waves in cellular communications, Proceedings of IEEE VTC, Baltimore, MD, USA, 2008.

* cited by examiner

METHOD AND ARRANGEMENT FOR POLARIZATION CONTROL IN A COMMUNICATION SYSTEM

RELATED APPLICATIONS

This application is a continuation of U.S. application Ser. No. 13/020,205, filed Feb. 3, 2011, which claims the priority and benefit of U.S. Application No. 61/389,796 filed on Oct. 5, 2010, the disclosure of which is incorporated herein by reference in its entirety.

TECHNICAL FIELD

The present disclosure refers to communication systems in general and specifically to polarization state control for transmission signals in such systems.

BACKGROUND

Figure 1:
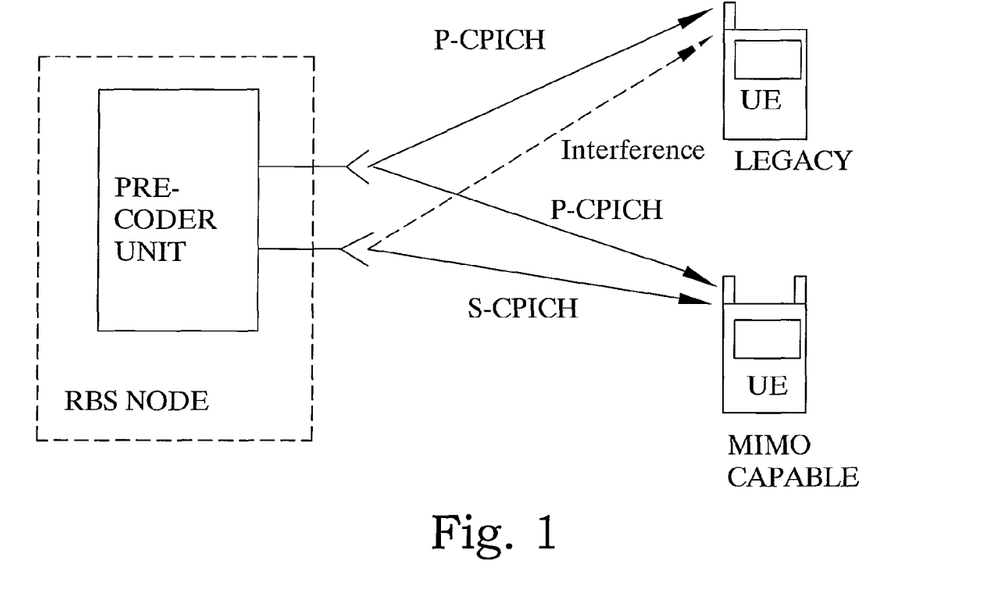
FIG. 1 is a schematic illustration of a system in which the embodiments of the present disclosure can be implemented.

The introduction of MIMO capabilities in existing WCDMA/HSPA networks is an important step in the evolution of the technology towards higher spectral efficiency and bitrates. With MIMO at least two transmit antennas needs to be used within the same cell. However, the introduction of a second transmit antenna port has a negative influence for legacy user equipment (UE) for which the signals transmitted on the second antenna port will show up as interference, as illustrated in FIG. 1. Ideally, since the second antenna port signals, such as the S-CPICH and the MIMO streams, are transmitted with channelization codes that are orthogonal to the ones used for the legacy users, this interference will be fully orthogonal and therefore completely suppressed. However, the orthogonality of the codes is only guaranteed when the codes are transmitted over non-dispersive channels, which is typically not the case. Even a state of the art MMSE receiver will not be able to fully suppress this interference. Thus the presence of a S-CPICH pilot or MIMO traffic in the cell can have negative consequences for the perceived communication quality for a UE that is demodulating information only from antenna port 1, referred to in the following as a legacy user.

Therefore, there is a need of methods and arrangements for reducing the interference for legacy user equipment in a MIMO capable communication system.

SUMMARY

It is an object to obviate at least some of the above disadvantages and provide an improved radio base station.

One aspect of the present disclosure includes a method of controlling the polarization state of signals to be transmitted from a MIMO capable radio base station node to a plurality of user equipment, which radio base station node comprises a precoder unit connecting a first and a second virtual antenna port to a respective first and second transmit antenna port. The method includes controlling a relative phase between transmitted signals from the first transmit antenna port and the second transmit antenna port to provide a predetermined pair of orthogonal polarization states for signals transmitted on the first and said second virtual antenna ports, and interchanging the polarization states of the first and second virtual antenna ports, to provide transmitted polarized signals with alternating polarization states.

A second aspect of the present disclosure includes a MIMO capable radio base station node comprising a precoder unit connecting a first and a second virtual antenna port to a respective first and a second transmit antenna port for transmitting signals to a plurality of user equipment. The radio base station node further comprises a controller configured to control a relative phase between transmitted signals from the first transmit antenna port and the second transmit antenna port to provide a predetermined pair of orthogonal polarization states for signals transmitted on the first and the second virtual antenna ports. In addition, the radio base station node comprises a polarization switch configured to interchange the polarization states of the first and second antenna ports, to provide transmitted polarized signals with alternating polarization states.

An advantage of the invention is that the use of a vertical polarization or a horizontal polarization for (virtual) antenna port 1 will result in a certain suppression of the interference a legacy UE experiences from transmissions on antenna port 2. The practical gain from this suppression is expected to be in the order of 1-2 dB. The invention may thus be used to ease the introduction of MIMO capability in the HSPA network, as the negative consequences for legacy UEs of such an introduction can be reduced.

Another advantage of implementing the invention is that it also allows coordination of transmit polarization between cells, which may give further gains in suppressing inter-cell interference.

BRIEF DESCRIPTION OF THE DRAWINGS

The invention, together with further objects and advantages thereof, may best be understood by making reference to the following description taken together with the accompanying drawings, in which.

ABBREVIATIONS

CQI Channel Quality Indicator
HP Horizontal Polarization
HSPA High Speed Packet Access
HS-PDSCH High Speed Physical Downlink Shared CHannel
LHCP Left Hand Circular Polarization
MIMO Multiple Input Multiple Output
P-CPICH Primary-Common Pilot CHannel
RBS Radio Base Station
RHCP Right Hand Circular Polarization
RNC Radio Network Controller
S-CPICH Secondary-Common Pilot CHannel
UE User Equipment
VP Vertical Polarization
WCDMA Wideband Code Division Multiple Access

DETAILED DESCRIPTION

Throughout the drawings, the same reference numbers are used for similar or corresponding elements. Although the present disclosure mainly deals with and describes the case of vertical and horizontal polarization states, the same methodology can be applied to other orthogonal polarization states as well without diverging from the main objective of the disclosure.

Figure 5:
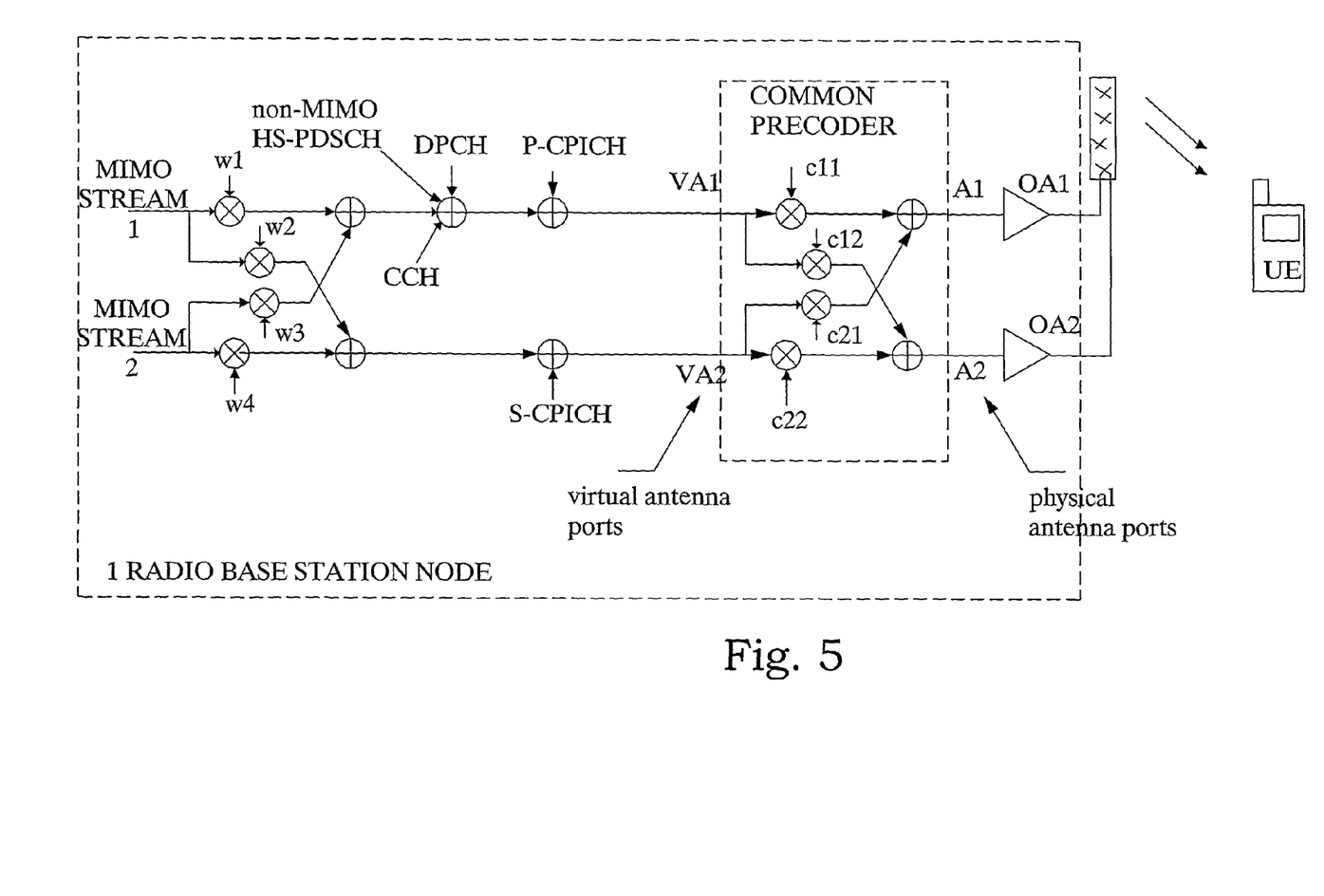
FIG. 5 is a schematic illustration of a known radio base station node.

A recent devolvement for balancing power between power amplifiers associated with each of two transmit antennas in MIMO capable equipment in WCDMA/HSPA systems, and to enable legacy UEs to benefit from the total available power involves the introduction of a common precoder (see FIG. 5). The precoder distributes each signal to be transmitted with equal amplitude on the two power amplifiers. When used in combination with a cross polarized transmit antenna, this will result in a transmitted polarization which is a linear combination of the two antenna polarizations. A phase shift between the two antenna branches, whether it occurs in the transmitters, the feeders, or in the antennas, will affect the final polarization that is transmitted. As an example, for a +45/−45 polarized antenna with 0° phase shift between the branches, a common precoder on the form below in Equation 0:

$$\begin{pmatrix} p_1 \\ p_2 \end{pmatrix} = \frac{1}{\sqrt{2}} \begin{pmatrix} 1 & e^{j\pi/4} \\ j & e^{-j\pi/4} \end{pmatrix} \begin{pmatrix} v_1 \\ v_2 \end{pmatrix}, \quad \text{(Eq. 0)}$$

will result in transmissions from antenna port 1 such as the P-CPICH or HS data being of left hand circular polarization (LHCP). A 180° phase shift results in right-hand circular polarization (RHCP), while 90° and 270° result in vertical polarization (VP) and horizontal polarization (HP) respectively. In each case, the transmissions from antenna port 2, such as the S-CPICH will always be transmitted from an orthogonal polarization to antenna port 1.

According to another recent development, interference between different users has been dealt with by utilizing polarization as a means for reducing interference between users. This objective was achieved through scheduling of transmissions to multiple users on particular polarizations whose orthogonality essentially remained also after propagation over the wireless radio channel. In non-line of sight conditions, vertical and horizontal polarizations fulfill this criterion of maintaining elements of the orthogonality and are thus preferable to use. By identifying user devices with a preference for vertical or horizontal polarization it is possible to pair such users for simultaneous scheduling, resulting in less interference between these users.

Based on the above-discussed properties and prior art, the inventors have identified a beneficial method and arrangement for improving the interference situation for legacy users in a MIMO system utilizing a common precoder. Basically, this is achieved by controlling the polarization of the signals to be transmitted from the virtual antenna ports of the common precoder such that the signals have one of two beneficial polarization states e.g. that they are mainly vertically or horizontally polarized. Together with the knowledge of preferred polarization states for user equipment in the system, it is possible to schedule users during periods of corresponding polarization of the signals.

A basic embodiment of the present disclosure aims to adjust S10 the relative phase between transmitter branches such that antenna port 1, on which P-CPICH and legacy HS data is transmitted, and antenna port 2 on which the S-CPICH is transmitted, are each transmitted with either vertical or horizontal polarization. In order to benefit both UE with a preference for either VP or HP, the antenna ports or at least the polarization of the respective antenna ports are interchanged S20, in time or frequency. In short, the antenna ports are interchanged (or equivalently, a 180° additional phase shift) in time or over frequency such that all legacy UEs that experience a preference for one of the two polarizations can be made to benefit from an increased suppression of the S-CPICH and associated interference from antenna port 2. To elaborate, UEs that have a preference for VP can be scheduled during times or on frequencies where antenna port 1 is mapped to VP thereby gaining an additional diversity gain as well as an improved suppression of the HP transmissions from antenna port 2. UEs with a preference for HP can instead be scheduled during times or on frequencies where antenna port 1 is mapped to HP.

As vertical and horizontal polarizations are maintained to a greater degree than other polarizations during propagation through the environment, a certain improvement can be achieved in the signal to interference ratio at the receiver. Although the embodiment has been described with relation to vertical and horizontal polarization, the same method can be applied to any type of orthogonal polarization.

Figure 2:
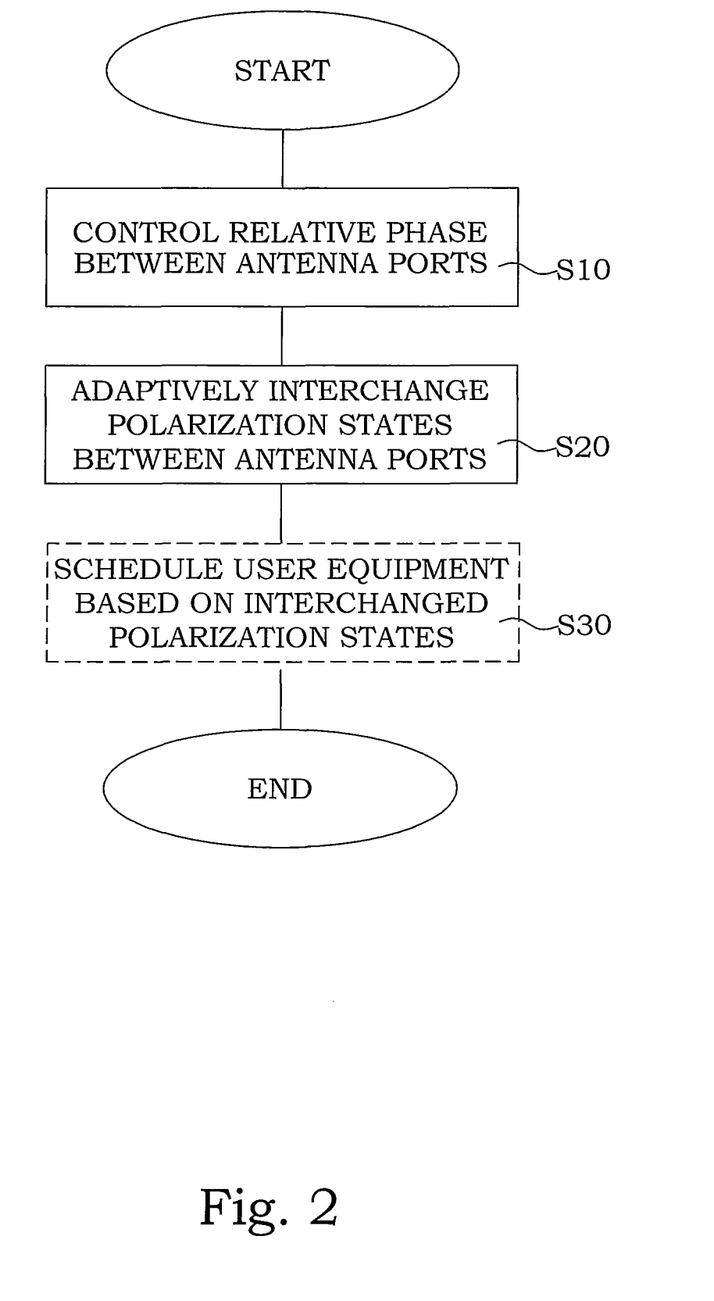
FIG. 2 is a schematic flow diagram of an embodiment of a method according to the present invention.

With reference to FIG. 2 an embodiment of a method of controlling the polarization states of signals to be transmitted from a MIMO capable radio base station node according to the present invention will be described. The radio base station includes a common precoder unit, which connects a first, and a second virtual antenna port to a respective first and second transmit antenna port, via a respective power amplifier. During operation the relative phase or phase difference between transmitted signals from the first and second transmit antenna ports is controlled S10 to provide a predetermined pair of orthogonal polarization states for signals transmitted on the first and second virtual antenna ports. In addition, the polarization states of the virtual antenna ports are periodically interchanged S20 to provide transmitted polarized signals with alternating polarization states. In doing so, legacy user equipment with preference to one or the other of the predetermined polarization states are benefited of the interference reduction.

Figure 3:
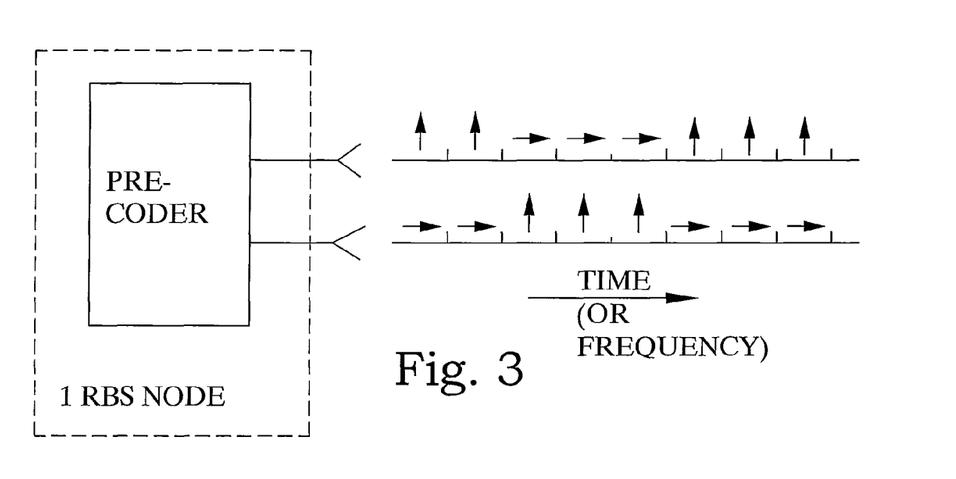
FIG. 3 is a schematic illustration of an embodiment of a method according to the present disclosure.

As an example, FIG. 3 illustrates how the polarization states are interchanged S20. The arrows illustrate vertical polarization and horizontal polarization during particular periods or time intervals on the two antennas respectively. The same illustration could serve to show a corresponding interchange between RHCP and LHCP, or other orthogonal polarization states.

To enable more detailed insight into the benefits of the present disclosure, a few particulars about HSPA and polarization will be described below.

A HSPA radio base station node typically transmits a pilot signal, the P-CPICH, which the UEs can use to estimate the channel and thereby demodulate the data traffic (e.g. the HS-PDSCH channel). When the radio base station is configured for MIMO transmission, a second pilot signal, the S-CPICH, needs to be transmitted from the second antenna in order to allow MIMO capable UEs to perform channel estimation and demodulate MIMO transmissions. The use of a common precoder to balance the power utilization of legacy (non MIMO capable) UEs over the two power amplifiers (PAs) of a MIMO capable base station has been previously described. In short, a common precoder is applied before the power amplifiers in order to provide power balancing for MIMO as well as SISO signals. By excluding two MIMO precoding weights, power balancing is achieved also for single stream MIMO signals. FIG. 5 illustrates the operation of a common precoder as well as how the pilot and data channels are mapped to the antennas.

As mentioned previously, one drawback of introducing a second transmit antenna is that legacy UEs will suffer from interference from the pilot and data traffic that is transmitted from the second antenna. WCDMA and HSPA utilize orthogonal spreading codes for the different channels such as P-CPICH, S-CPICH, HS-PDSCH, etc, as well as for different concurrent users. Thus, ideally the S-CPICH and MIMO data traffic will be fully orthogonal to the desired signal e.g. HS-PDSCH for legacy users. In a time-dispersive channel, the orthogonality between the codes is degraded leading to interference between the signals. A state of the art UE receiver can to some extent compensate for this degradation by equalizing the channel, e.g. via the use of a linear MMSE receiver. However, when some of the signals are transmitted over a different channel, such as is the case for the signals transmitted from antenna 2, the MMSE receiver will be less effective at suppressing the interference. The degradation of legacy UE performance that this leads to has been observed in practice and adds an undesirable tradeoff between the gains for enabling MIMO and the losses experienced by legacy UEs. It is therefore desirable to minimize the impact of the interference from the S-CPICH and MIMO traffic.

One possible way of reducing the interference from the S-CPICH is to utilize the fact that the common precoder in combination with a dual-polarized antenna in essence changes the polarizations that the antenna ports are mapped to. Mathematically, the polarization of a plane wave propagating in the z-direction can be described using a complex unit vector p as follows in Equation 1:

$$p = p_x \hat{x} + p_y \hat{y}, \ |p_x|^2 + |p_y|^2 = 1 \quad (\text{Eq. 1})$$

Here $\hat{x}$ and $\hat{y}$ are Cartesian unit vectors. For a vertically polarized wave (the electric field vector is oscillating along the y-axis), $p_v = p_y \hat{y}$, ($p_x = 0$); for a horizontally polarized wave, $p_h = p_x \hat{x}$ ($p_y = 0$). A slant linear +45-degree polarized wave has $p_x = p_y$, while a −45-degree polarized wave has $p_x = -p_y$. Finally, circular polarization (the electric field vector is rotating in the x-y plane) occurs when the two components are 90 degree out of phase, e.g. $p_x = ip_y$ for left-hand circular (LHCP) and $p_x = -ip_y$ for right-hand circular polarization.

The polarization of the superposition of a signal transmitted with complex amplitude a from a +45-polarized antenna and complex amplitude b from a −45-polarized antenna is shown in Equation 2

$$p = ap_{+45} + bp_{-45} \quad (\text{Eq. 2})$$
$$= a\frac{1}{\sqrt{2}}(\hat{x} + \hat{y}) + b\frac{1}{\sqrt{2}}(\hat{x} - \hat{y}) =$$
$$= \frac{1}{\sqrt{2}}(a+b)\hat{x} + \frac{1}{\sqrt{2}}(a-b)\hat{y}$$

The previously mentioned common precoder maps the P-CPICH and HS data to the two antenna ports with complex amplitudes $a = 1/\sqrt{2}$, $b = i/\sqrt{2}$. In the absence of any further phase shift, this can be shown to result in circular polarization in Equation 3:

$$p_{HS} = ap_{+45} + bp_{-45} \quad (\text{Eq. 3})$$
$$= a\frac{1}{\sqrt{2}}(\hat{x} + \hat{y}) + b\frac{1}{\sqrt{2}}(\hat{x} - \hat{y})$$
$$= \frac{1}{2}(1+i)\hat{x} + \frac{1}{2}(1-i)\hat{y} =$$
$$= ip_y \hat{x} + p_y \hat{y}$$

with $$p_y = \frac{1}{2}(1-i)$$

As mentioned previously, introducing a phase shift $e^{i\theta}$ on one of the branches after the common precoder (the phase shift can either be intentionally through a complex multiplication in the baseband or unintentionally through lack of calibration, phase drift, antenna differences, or even a combination of the two) creates a new effective polarization, see Equation. 4 below.

$$p_{HS} = ap_{+45} + be^{j\theta}p_{-45} \quad (\text{Eq. 4})$$
$$= a\frac{1}{\sqrt{2}}(\hat{x} + \hat{y}) + be^{j\theta}\frac{1}{\sqrt{2}}(\hat{x} - \hat{y}) =$$
$$= \frac{1}{2}\left(1 + e^{i\left(\theta + \frac{\pi}{2}\right)}\right)\hat{x} + \frac{1}{2}\left(1 - e^{i\left(\theta + \frac{\pi}{2}\right)}\right)\hat{y}$$

From the above it is apparent that setting the phase shift to e.g. +90° or −90° gives VP or HP respectively, while 0° or 180° gives LHCP or RHCP. Other phase shifts will result in an elliptical polarization. (A phase shift before the common precoder will not change the polarization of virtual antenna port 1 or 2, though it will change the effective polarization of the precoded MIMO streams.)

It is then observed by the inventors that by controlling the phase shift it is possible to control the effective polarization of the first virtual antenna port (on which the P-CPICH and the HS data is transmitted). It needs to be kept in mind that the second virtual antenna port will always result in a polarization that is orthogonal to that of the first virtual antenna port. This is since the common precoder represents a unitary mapping that maintains the orthogonality of the two input ports. Consequently, the effective polarization of both virtual antenna ports can be controlled by controlling the phase shift.

Experimental investigations have shown that the optimal polarization is VP for some UEs and HP for other UEs. This can be understood from the following argumentation:

The polarization of a certain UE is a function of antenna design, orientation, user interaction, etc., and can for all purposes be considered as quite random. However, it has been observed that vertically and horizontally polarized radio waves keep their polarization to a large degree when propagation through a typical environment. If a certain UE has more vertical than horizontal polarization it will therefore receive signals transmitted from a vertically polarized antenna with more power than signals transmitted from a horizontally polarized antenna. This is not the case if the signals are transmitted from a pair of antennas whose polarizations have equal magnitude projections on vertical and horizontal polarization. Examples of such antennas are +45/−45 slant linearly polarized or left-hand/right-hand circularly polarized.

One aspect of the present disclosure is then to adjust S10 a phase offset between the two outputs of the common precoder such that the resulting effective polarizations to which the virtual antenna ports are mapped provide best antenna port separation at the UE(s). As discussed previously, this is often achieved by VP and HP. Therefore, we will use the VP/HP optimality assumption in the rest of the disclosure, but without limiting the scope of the invention.

For a legacy UE with more sensitivity to VP than to HP it will therefore be beneficial to transmit antenna port 1 on VP as this reduces the interference from the horizontally polarized antenna port 2. Another legacy UE that may be more sensitive to HP than to VP will instead benefit from antenna port 1 being mapped to HP. The gains from such a per-UE optimization have been evaluated using experimental data and where it has been found that the signal to interference ratio (SIR) can improve by between 1-2 dB when selecting the best of VP and HP, and up to 5 dB with instantaneous optimization. However, it should be noted that for a given polarization, e.g. VP, users with a preference for HP would instead experience a SIR loss of similar magnitude.

A challenge is that the common precoder weights and associated phase shift needs to be common for all users in the cell since the cell-common pilot signal (P-CPICH) and the data (HS-PDSCH) must be transmitted over the same channel (otherwise the channel estimates used by the UEs in demodulation will be erroneous). When a single user is scheduled at a time, this is not an issue, but it is impossible to simultaneously optimize the transmit polarization for two users having opposite VP/HP preferences. Consequently, according to a further embodiment, the antenna ports are periodically interchanged S20, either by actually interchanging the antenna ports, or by introducing a 180 phase shift. Thereby, user equipment with a preference towards one or the other polarization state will periodically benefit from the interference reduction.

Cycling between polarization states e.g. VP and HP can be achieved by interchanging S20 the polarization states of the virtual antenna ports by adapting the relative phase between the transmitted signals. This cycling of the transmit polarization can be done in time, either with regular equal length time intervals, or in the case that the majority of UEs prefer one particular polarization, with non-equal time intervals. A further variant is to base the cycling on predetermined event triggers, such as when the general tendency of UEs in the cell changes from one polarization to the other due to arrival of new UEs. There are two ways of changing the mapping from virtual antenna to physical polarization: either the phase shift is incremented +180° or −180°, or the outputs of the common precoder are interchanged with each other. The first option results from the fact that a 90° phase shift gives vertical polarization while −90° gives horizontal polarization. Cycling of transmit polarization will give a gain in case that the UEs are preferentially scheduled to a time slot when the polarization is optimal for that particular user. Experimental investigations have shown that such scheduling in combination with polarization "hopping" between VP and HP has the potential for an average SIR gain of 1-2 dB. However, in order to reach these gains while avoiding additional scheduling delays, the hopping needs to be sufficiently fast. If, say, scheduling delays of more than 20 ms are unacceptable then the polarization needs to be changed on this time scale.

One challenge with cycling the transmit polarization in time is that the perceived channel will have discontinuities at each switching point. This may cause problems for UEs, especially for such functionality that relies on filtered estimates as can be the case for e.g. interference or channel estimation. It is therefore desirable to minimize the frequency of polarization switching, however at the same time considering the tradeoff vs. scheduling delays and SIR gain.

Another alternative is to vary the transmit polarization smoothly by e.g. letting the phase shift vary continuously and smoothly in time. This has the drawback that the optimal VP or HP polarizations will be utilized only when the phase shift is close to +90° or −90°, but it may be minimized by making the smooth transition from one stable polarization state to another relatively fast. A switching time constant on the order of for example 5 slots is expected to cause small, if any, degradation to the filtering processes in the UE.

According to a further embodiment, the step of interchanging S20 the polarization states of the antenna ports can be performed by switching signals from the first and second virtual antenna ports between the first and second transmit antenna ports. The interchange can be performed adaptively, as well as deterministically with regular equal or non-equal time intervals.

According to a further embodiment of the disclosure, the polarization state is instead cycled in the frequency domain. This can be achieved if the base station is configured with two or more carriers covering a same area or cell, as in a multi-carrier implementation. Consider e.g. the case with two carriers. These two carriers can be considered as two separate cells where the transmit polarization for each carrier may be tuned such that it becomes VP for one of the carriers and HP for the other. The practical result of this will be a form of polarization diversity between the carrier frequencies. As a result a certain UE can then be scheduled onto the carrier for which it reports the best CQIs (channel quality indicators) and hence automatically benefit from the optimal polarization since the CQI is related to the experienced SIR. The concept can be extended if there are more than two carriers covering the same area, by dividing the carriers into two subsets, one subset tuned for VP and one for HP. A third subset can also be introduced, in which the polarization is tuned for the MIMO users instead through the introduction of a phase shift such that the MIMO1 and MIMO2 streams are encoded onto VP or HP. This third state can also be introduced when cycling the transmit polarizations in time.

For UEs incapable of multi-carrier reception, the UE will be operating on one carrier at the time. If different carriers are tuned to different polarizations, it may be beneficial to steer these UEs towards carriers with beneficial polarization properties. Consequently, if a base station node is configured with a plurality of carriers covering a same sector, it is possible to perform the polarization state exchange by adaptively interchanging the polarization state between different carriers in the frequency domain. This can be done by inter-frequency handovers during connection and/or redirection to a different carrier at channel switching when switching from CELL_DCH to CELL_FACH/CELL_PCH/URA_PCH. By comparing the connection quality statistics (e.g. CQI) for the UE on different carriers, the network can then determine which carrier to allocate the UE to. Probing of the channel quality on other carriers than the one the UE is currently operating on can be done by redirecting the UE to a new carrier. If the performance improves, the UE is allowed to stay on the new carrier, but if performance is degraded the UE can be redirected back to the old carrier.

According to a particular embodiment, the RBS and RNC may cooperate in these decisions since it is the RBS that has the best knowledge of the UE's radio conditions (reported CQI etc), while it is the RNC that handles the orders to direct the UE to go to different carriers. This cooperation can be aided by introducing new signaling from RBS to RNC, where the RBS can inform the RNC of the observed performance for the UE on a particular carrier (such as average CQI). The RNC would then be responsible for evaluating which carrier that gives the optimum UE performance. Another solution would be to let the RBS recommend the RNC to redirect the UE to other carriers. The RBS would then be responsible for evaluating which carrier that gives the optimum UE performance.

According to a specific embodiment, the plurality of carriers are divided into two subsets, each subset having a respective of the pair of predetermined orthogonal polarization states.

One important pre-requisite of the invention is the phase optimization that leads to VP or HP. This can be done based on a form of test-and-observe approach using e.g. CQI statistics or throughput measurements. One particular circumstance in the present invention is the fact that while one polarization of VP or HP will be optimal for some users, it will at the same time be the worst polarization for other users. The above can then be expanded to search for a phase shift $\theta_{opt}$ that maximizes the differences in e.g. per-user CQI statistics, throughput, or similar measures, between the phase shifts $\theta_{opt}$ and $\theta_{opt}+\pi$. This phase shift will then with a large probability be one that results in either VP or HP. If a single UE is scheduled for an extended time, the phase shift may be optimized by maximizing the average CQI reported by the UE, without explicitly targeting VP or HP modes.

Another particular circumstance is that the phase shift that gives VP or HP for legacy (non-MIMO) users will at the same time result in effective polarizations for the MIMO encoded streams that are LHCP or RHCP. This is due to the nature of the MIMO precoding codebook in combination with the common precoder. As LHCP and RHCP are not preserved during propagation, these two polarizations will become statistically indistinguishable from each other, and the two precoders will therefore be selected equally often. In contrast, when the MIMO streams are precoded onto VP and HP, it is likely that one of the two precoders will be more suitable for a given UE, e.g. when that particular user has two antennas with similar polarizations, say HP. Thus, one criteria for determining a phase shift that gives VP/HP for legacy users is that this phase shift will tend to equalize the likelihood of different single-stream precoders being used for the MIMO users. The opposite approach includes using a phase shift that maximizes the difference in utilization of the precoders to find VP/HP for the MIMO transmissions. This approach can also be applied, but then the identified phase shift is further shifted 90° in order to make the P-SPICH and S-CPICH VP/HP-polarized rather than the MIMO stream transmissions.

According to a further embodiment, the situation with multiple users with conflicting VP/HP preferences is handled via prioritization of some users, i.e. the polarization choice is based on certain user(s) while the other users are not considered. Preferably, the prioritizing of the plurality of user equipment is performed prior to scheduling. Such prioritization could be based on fairness considerations, such as when prioritizing users that are on the cell edge and therefore in worse C/I conditions, with the goal of improving the worst SIRs in the cell. Alternatively, it could be based on different QoS classes depending on subscription types (e.g. premium subscribers get preferential treatment), traffic content, mobility etc. In this aspect of the invention, the transmit polarization is chosen to maximize some cost function other than the average cell SIR.

According to yet another embodiment, the scheduler is adapted to determine what UEs to schedule depending on what transmit polarization is currently utilized in the cell. Consequently, scheduling (S30) of transmissions to said plurality of user equipment is performed based on a current transmit polarization state in the cell. The scheduler could of course operate independently of the polarization hopping, in which case the scheduling decisions are only based on the current CQIs reported by the different UEs. However, if the scheduler is aware of the hopping pattern, it can predict how the CQIs will change when the transmit polarization is changed, and thereby more efficiently assign resources to those UEs that will experience a transmit polarization that is well matched to their antenna and channel characteristics. One method of utilizing such awareness of the hopping pattern is to put more weight to CQI reports from time instants where the transmit polarization equals the current transmit polarization. Another method is to maintain a record for each UE of what polarization it prefers, where such information may either be established using the method as described previously or it may be obtained from measurements of e.g. uplink characteristics or even measured in other parts of the system and shared between base stations When the frequency domain cycling of transmit polarizations is used, the scheduling decisions become much easier as current measurements will be available for both polarizations. The only requirement is then that the scheduler can jointly schedule users over the two (or more) carriers. If not, then the benefits of polarization can probably still be achieved using admission control that takes the polarization preference into account.

According to a particular embodiment, the interchange of polarization states is performed in response to predetermined event triggers. Those event triggers may be represented by one or more of the below:
1) Specific individual performance or identifying degradation of performance, e.g. measured throughput, SNIR, etc
2) System or cell accumulated performance (identifying degradation), e.g. cell accumulated throughput, etc.
3) Traffic demand changes
    3a) individual users, e.g. ready with a download (empty buffer, page download ready, request for download, buffer build up, etc.
    3b) change of number of active users in cell, e.g. new users arriving, users leaving, etc.

Figure 4:
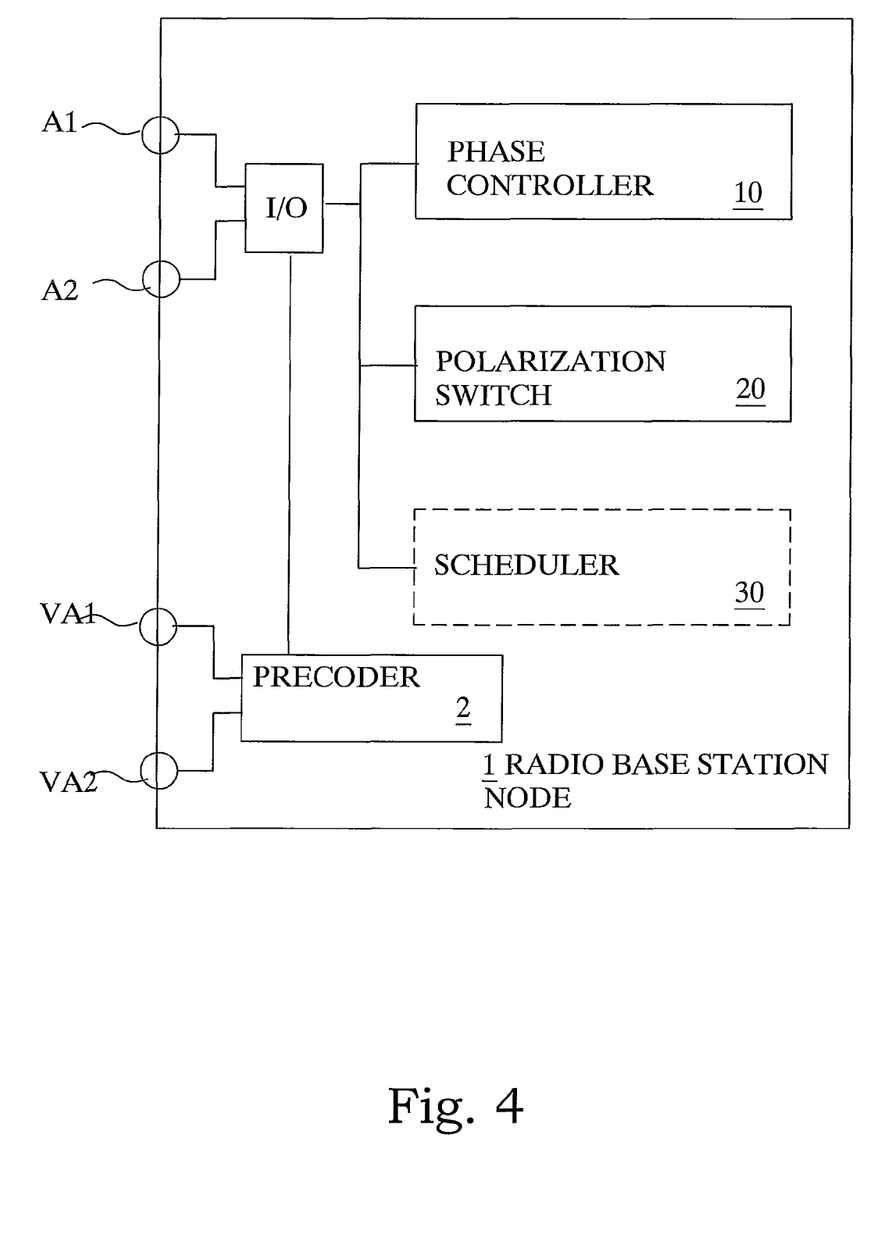
FIG. 4 is a schematic illustration of an embodiment of a radio base station node according to the present invention.
Figure 6:
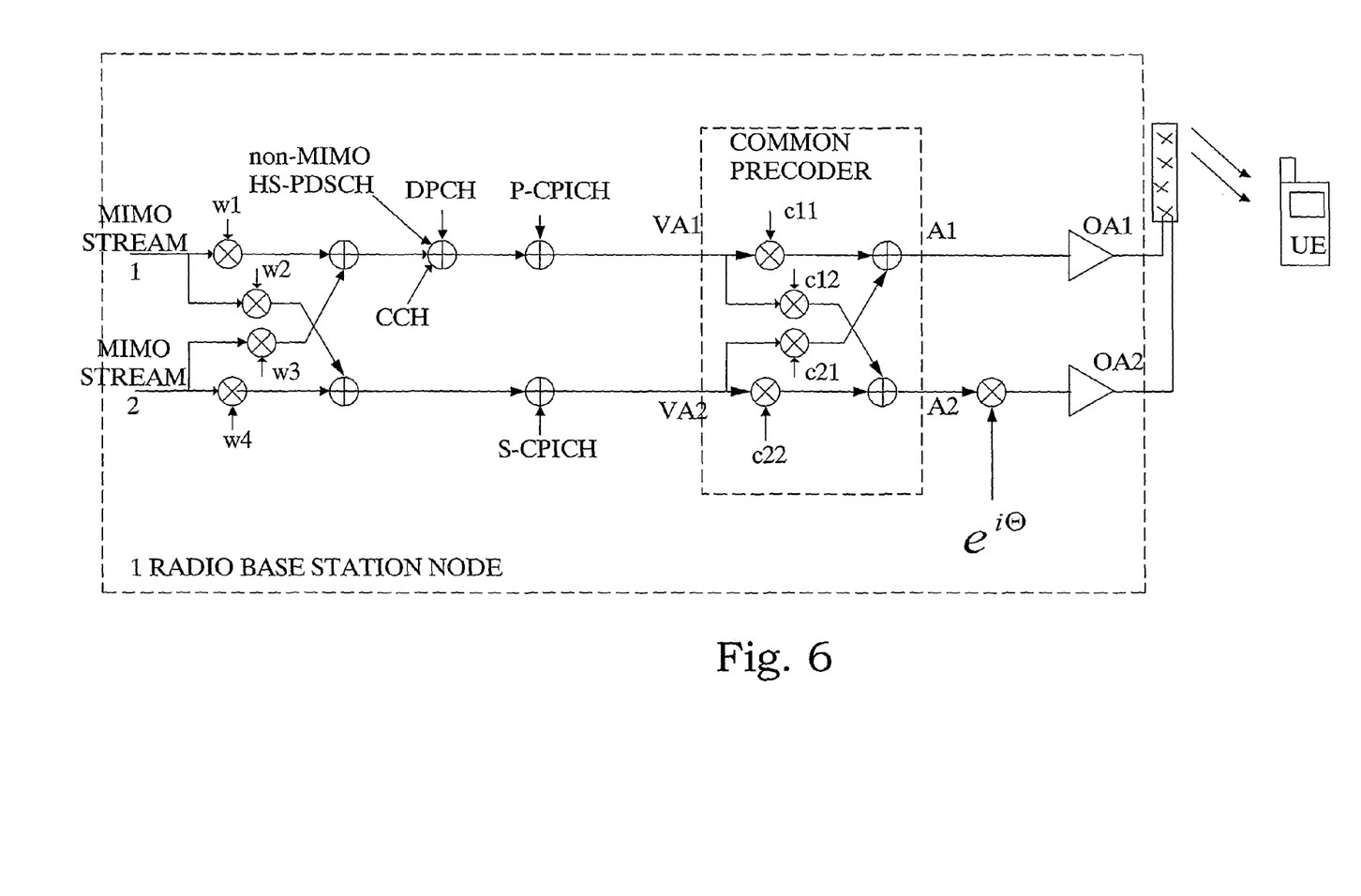
FIG. 6 is a schematic illustration of an embodiment of a node according to the present disclosure.
Figure 7:
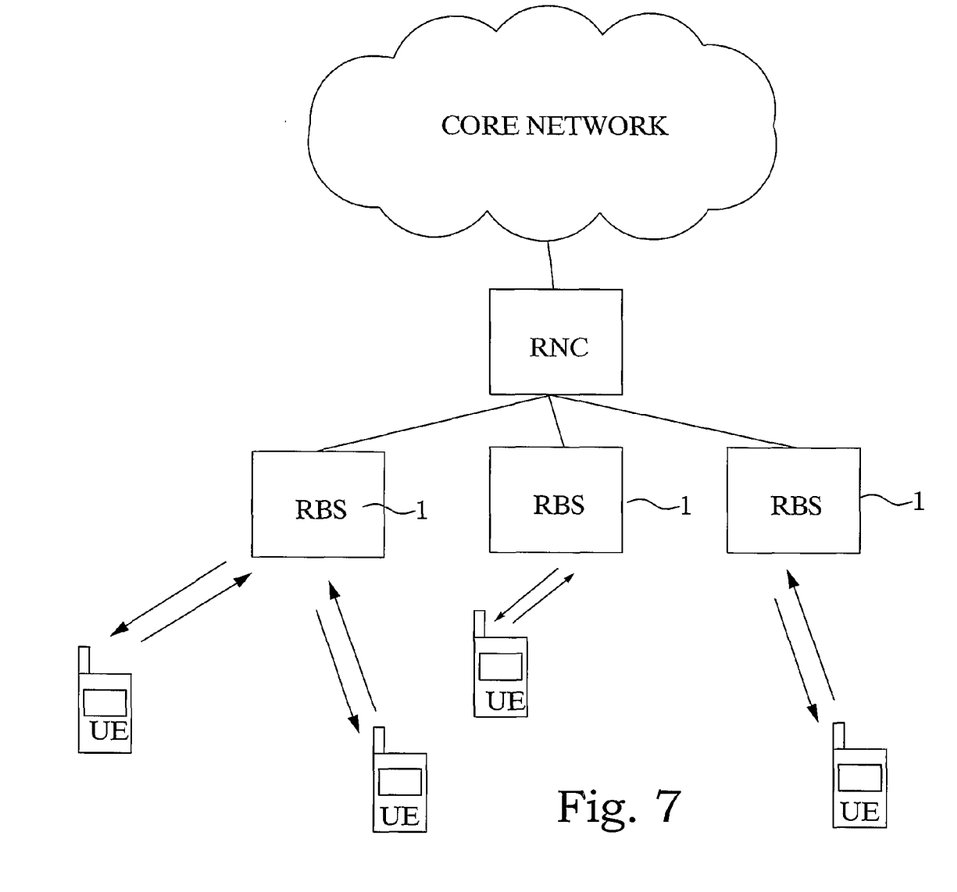
FIG. 7 illustrates a general communication network in which embodiments of the present disclosure can be implemented.

With reference to FIG. 4 and FIG. 6, embodiments of a MIMO capable radio base station node 1 according to the present disclosure will be described. The radio base station node comprises a precoder unit 2 connecting a first and a second virtual antenna port VA1, VA2 to a respective first and a second transmit antenna port A1, A2 for transmitting signals to a plurality of user equipment. In addition, the radio base station node 1 includes a controller 10 configured to control a relative phase between transmitted signals from the first transmit antenna port A1 and the second transmit antenna port A2 to provide a predetermined pair of orthogonal polarization states for signals transmitted on the first and the second virtual antenna ports VA1, VA2. Finally, the radio base station node 1 includes a polarization switch 20 configured to interchange the polarization states of the first and second antenna ports A1,A2, to provide transmitted polarized signals with alternating polarization states.

The polarization switch 20 can be configured to interchange the polarization states adaptively or deterministically, either in time or frequency.

According to a further embodiment, the radio base station node 1 includes a scheduler 30 configured to schedule transmissions to the plurality of user equipment based on a current transmit polarization state in the cell.

The radio base station node 1 is configured to enable execution of all the method steps described previously.

The main advantage of the disclosure is that the use of a vertical polarization or a horizontal polarization for (virtual) antenna port 1 will result in a certain suppression of the interference a legacy UE experiences from transmissions on antenna port 2. The practical gain from this suppression is expected to be in the order of 1-2 dB. The invention may thus be used to ease the introduction of MIMO capability in the HSPA network, as the negative consequences for legacy UEs of such an introduction can be reduced.

A further advantage of the frequency-domain polarization cycling is that this can be introduced with no negative consequences for the UEs in terms of increased channel variability or discontinuities. Additionally, it can be introduced with minimal impact on scheduler design in the case when the scheduler already jointly addresses two or more carriers.

Yet another advantage of implementing the invention is that it also allows coordination of transmit polarization between cells, which may give further gains in suppressing inter-cell interference.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of controlling the polarization state of signals to be transmitted from a MIMO capable radio base station node of a cell to a plurality of user equipment, said radio base station node comprising a precoder unit connecting a first and a second virtual antenna port to a respective first and second transmit antenna port, the method comprising:
controlling a relative phase between transmitted signals from said first transmit antenna port and said second transmit antenna port to provide a predetermined pair of orthogonal polarization states for signals transmitted on said first and said second virtual antenna ports; and
interchanging the polarization states of said first and second virtual antenna ports by adapting said relative phase between said transmitted signals continuously in time, to provide transmitted polarized signals with alternating polarization states,
wherein said base station node is configured with a plurality of carriers covering a same sector and said polarization states are interchanged between at least two of said carriers in the frequency domain.

2. The method according to claim 1, comprising the further step of scheduling transmissions to said plurality of user equipment based on a current transmit polarization state in said cell.

3. The method according to claim 2, further comprising prioritizing said plurality of user equipment prior to scheduling.

4. The method according to claim 1, wherein said polarization states are interchanged by switching signals from said first and second virtual antenna ports between said first and second transmit antenna ports.

5. The method according to claim 1, wherein said polarization states are interchanged adaptively.

6. The method according to claim 1, wherein said polarization states are interchanged in response to predetermined event triggers.

7. The method according to claim 1, further comprising the step of scheduling user equipment onto one of said plurality of carriers based on at least a reported connection quality performance for said carriers.

8. The method according to claim 7, further comprising redirecting a user equipment from one carrier to another carrier based on a current polarization state of said carriers and a polarization preference of said user equipment.

9. The method according to claim 1, comprising the further step of dividing said plurality of carriers into two subsets, each subset having a respective of said pair of predetermined orthogonal polarization states.

10. The method according to claim 1, wherein said pair of predetermined polarization states comprises vertical and horizontal polarization.

11. A MIMO capable radio base station node of a cell, said radio base station node comprising a precoder unit connecting a first and a second virtual antenna port to a respective first and a second transmit antenna port for transmitting signals to a plurality of user equipment, the base station node comprising:
a controller configured to control a relative phase between transmitted signals from said first transmit antenna port and said second transmit antenna port to provide a predetermined pair of orthogonal polarization states for signals transmitted on said first and said second virtual antenna ports; and
a polarization switch configured to interchange the polarization states of said first and second antenna ports by adapting said relative phase between said transmitted signals continuously in time, to provide transmitted polarized signals with alternating polarization states,
wherein said base station node is configured with a plurality of carriers covering a same sector and said polarization switch is further configured to interchange said polarization states between at least two of said carriers in the frequency domain.

12. The radio base station node according to claim 11, said polarization switch being configured to interchange said polarization states adaptively.

13. The radio base station node according to claim 11, said radio base station further comprising a scheduler configured to schedule transmissions to said plurality of user equipment based on a current transmit polarization state in said cell.

14. The radio base station node according to claim 11, said radio base station node being configured to monitor a connection quality statistic for each such carrier, and to inform a radio network control node about said quality, and to redirect user equipment from one carrier to another based on instructions received from said radio network control node.

* * * * *

UNITED STATES PATENT AND TRADEMARK OFFICE
CERTIFICATE OF CORRECTION

PATENT NO.        : 9,559,763 B2
APPLICATION NO.   : 14/994956
DATED             : January 31, 2017
INVENTOR(S)       : Asplund et al.

It is certified that error appears in the above-identified patent and that said Letters Patent is hereby corrected as shown below:

On the Title Page

On Page 2, item (56), under "OTHER PUBLICATIONS", in Column 2, Line 4, delete "wih" and insert -- with --, therefor.

In the Specification

Column 1, Line 8, delete "2011," and insert -- 2011, now Pat. No. 9,270,359, --, therefor.

Column 2, Line 55, delete "Pilot" and insert -- PIlot --, therefor.

Column 2, Line 59, delete "Pilot" and insert -- PIlot --, therefor.

Column 4, Line 55, delete "HS-PDSCH channel)." and insert -- HS-PDSCH). --, therefor.

Column 5, Line 41, delete "$p_h=p_x\hat{x}(p_y=0)$." and insert -- $p_h=p_x\hat{x},(p_y=0)$. --, therefor.

Column 5, Line 43, delete "$p_x=p_y$." and insert -- $p_x=-p_y$. --, therefor.

Column 5, Line 45, delete "circular" and insert -- circular polarization --, therefor.

Column 5, Line 59, delete " $=\frac{1}{\sqrt{2}}(a+b)\hat{x}+\frac{1}{\sqrt{2}}(x-b)\hat{y}$ " and insert -- $=\frac{1}{\sqrt{2}}(a+b)\hat{x}+\frac{1}{\sqrt{2}}(a-b)\hat{y}$ --, therefor.

Signed and Sealed this
Twenty-fifth Day of July, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,559,763 B2

Column 6, Line 24, delete "$p_{HS} = ap_{+45} + be^{j\theta} p_{-45},$" and insert --$\mathbf{p}_{HS} = a\mathbf{p}_{+45} + be^{j\theta} \mathbf{p}_{-45}$--, therefor.

Column 6, Lines 25-26, delete "$= a\frac{1}{\sqrt{2}}(\hat{x}+\hat{y}) + be^{j\theta}\frac{1}{\sqrt{2}}(\hat{x}-\hat{y}) =$" and insert --$= a\frac{1}{\sqrt{2}}(\hat{x}+\hat{y}) + be^{j\theta}\frac{1}{\sqrt{2}}(\hat{x}-\hat{y}) =$--, therefor.

Column 7, Line 25, delete "cell-common pilot signal" and insert -- primary common pilot channel --, therefor.